March 8, 1966  J. O. TRIMBLE  3,239,590
METHOD OF MAKING COMPOSITE STRUCTURE
OF PLASTIC, ESPECIALLY FORMING DIE
Filed Jan. 29, 1962  6 Sheets-Sheet 1

INVENTOR
John O. Trimble
BY Karl L. Schiff
AGENT

INVENTOR
John O. Trimble
BY
AGENT

March 8, 1966 J. O. TRIMBLE 3,239,590
METHOD OF MAKING COMPOSITE STRUCTURE
OF PLASTIC, ESPECIALLY FORMING DIE
Filed Jan. 29, 1962 6 Sheets-Sheet 4

INVENTOR
John O. Trimble
BY
AGENT

March 8, 1966  J. O. TRIMBLE  3,239,590
METHOD OF MAKING COMPOSITE STRUCTURE
OF PLASTIC, ESPECIALLY FORMING DIE
Filed Jan. 29, 1962  6 Sheets-Sheet 5

INVENTOR
John O. Trimble
BY Karl L. Schiff
AGENT

March 8, 1966   J. O. TRIMBLE   3,239,590
METHOD OF MAKING COMPOSITE STRUCTURE
OF PLASTIC, ESPECIALLY FORMING DIE
Filed Jan. 29, 1962   6 Sheets-Sheet 6

INVENTOR.
John O. Trimble
BY Karl H. Schiff
AGENT

United States Patent Office 3,239,590
Patented Mar. 8, 1966

3,239,590
METHOD OF MAKING COMPOSITE STRUCTURE OF PLASTIC, ESPECIALLY FORMING DIE
John O. Trimble, Malvern, Pa., assignor to The Budd Company, Philadelphia, Pa., a corporation of Pennsylvania
Filed Jan. 29, 1962, Ser. No. 169,540
5 Claims. (Cl. 264—255)

This application is a continuation-in-part of my copending application, Serial Number 504,761, filed April 29, 1955 for "Article of Plastic, Especially Forming Die, and Method of Making It," and now abandoned.

The invention relates to a method of making a composite or built-up bonded die structure, such as a sheet-metal forming die, comprising as a main bonding element exothermic setting synthetic resins or plastics.

Large forming dies require that the dimensional accuracy of the forming face be within a few thousandths of an inch accuracy. Heretofore sheet metal forming dies were machined from cast metal blocks and hand finished to obtain this desired accuracy. It had been suggested that such dies be made by precision casting, but due to shrinkage and distortion of cast metals upon cooling, precision casting has not produced accurate forming dies. More recently high strength epoxy resins have become available which are vastly superior to phenolic and polyester thermosetting casting resins used heretofore for jigs and patterns. Epoxy resins have more desirable physical properties, cure at approximately room temperature by exothermic action, and for plastics have a relatively small amount of shrinkage. While the strength of epoxy resins is less than half the strength of cast die metals their strength may be improved by employing reinforcing materials such as fiber glass and hard powder fillers in a composite die.

Although the strength of epoxy resins has theoretically made it possible to construct sheet-metal-forming dies of reinforced plastics, distortion due to shrinkage and exothermic curing has created problems restricting their use for forming dies.

Conventional forming dies are subject to high pressures during forming operations and it has been found that while epoxy resins are strong physically they also display undersirable elongation characteristics. It has been determined that the tendency to spread or flow in compression and to elongate in tension can be eliminated by maintaining very thin layers of epoxy in the face of the die which is reinforced. The tendency to give or spread may be minimized in the die backing or bulk fill areas by employing a filler of shrink-free chunky material bonded together by a thin matrix of epoxy.

Cast metal dies shrink up to one-eighth inch per foot. Distortion due to shrinkage and thermal action does not allow duplication of contours by metal casting. Cast epoxy dies shrink as much as one percent or one-eighth inch per foot if the epoxy is cast in one solid block similar to a metal die. Distortion due to shrinkage and thermal action does not allow duplication of contours by casting epoxy in a solid block.

The applicant has discovered that composite plastic dies may be fabricated from high strength epoxy resins that will duplicate to an accuracy of several parts in one-ten thousandth the contour of a complex surface. This accuracy has been obtained in defiance of the thermal coefficient of contraction and expansion in a thermosetting epoxy resin and contrary to the rule of inherent shrinkage in the curing of thermosetting plastic masses.

It is therefore the primary object of the present invention to provide a new and improved method of making a plastic die for forming sheet metal.

A further object of the present invention is to provide a composite die structure which overcomes the serious shortcomings of known die structures and procedures employing synthetic resins or plastics.

A further object of the present invention is to provide a method of making a composite die structure employing epoxy resins which has an inherent strength greater than the strength of the pure epoxy resin.

A further object of the present invention is to provide a method of making a forming die that reduces the time and expense involved in making the die structure and maintains extreme dimensional contour accuracy.

The invention will be more fully understood and further features, objects and advantages explained in the following description of one embodiment of the invention which is illustrated in the drawing.

FIG. 8 is a section similar to FIG. 6 with part of the plastic-aggregate filled in.

The usual procedure in making any forming die starts out with a model (not shown) conforming to the inside surface of the stamping to be produced by the die.

Figure 1:
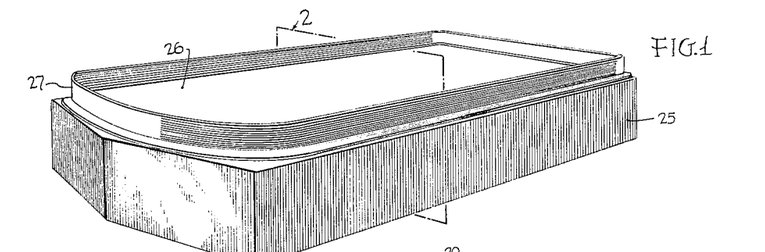
FIG. 1 is a perspective view of a mold, with an added dam, for making a die design to form the roof of an automobile.

A mold or form 25 (plastic, plaster of Paris or the like) is made from the model by any well known procedure and is made from the model by any well-known procedure and has a contour surface 26 representing a negative replica of the model and thereby of the working surface of the die to be made, this surface conforming again to the inside of the stamping to be produced by the die. Mold 25 is extended all around by a dam 27 and is horizontally supported by its plane underside 28 which bears a predetermined position in regard to working surface 26.

Figure 2:
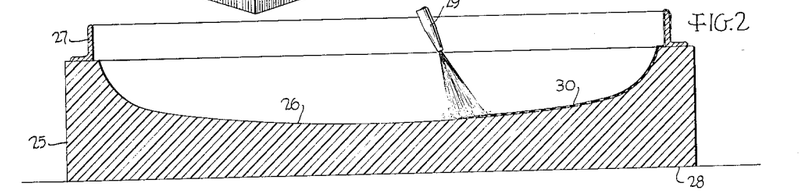
FIG. 2 is a section along the plane indicated by dot-and-dash lines 2 in FIG. 1.

Surface 26, after having been polished with a porous sealer silicone polish, and dam 27 are covered by sprayer 29 with a layer 30 of a parting agent (FIG. 2). The parting layer is then paste waxed and polished. This wax and parting layer 30 is to prevent a permanent bond between mold 25 and subsequently applied resin. Layer 30 actually has negligible thickness and merely presents a thin coating or parting film, but its thickness had to be greatly exaggerated in the drawing for showing it at all.

A layer 31 of facing resin filled with a hard powder and thixotropic agent, applied about 1/8 inch thick, is now spread over surface 26 and layer 30 and is allowed to harden. A filler of 20 to 50 percent by weight is sufficient to prevent the resin from flowing. This facing resin is a resin selected for great strength and wearability. The filler is selected for compressive strength and interlocking particle shape. Satisfactory for this purpose was found a resin available under the trade name Hysol XL–6045. Layer 31, after having hardened, is sanded to eliminate the slick dried surface and insure good adhesion of layer 32 which is to be applied next. This facing layer 31 must be kept thin for it has been found that a thick layer will allow heat build-up due to exothermic action. So long as the layer is thin the temperature throughout the layer is completely uniform and will set without shrinking. The thin layers apparently have sufficient surface adhesion at parting film 30 to cause the layer 31 to cure with internal stresses and completely avoid shrinkage. This action is similar to painting an object with a layer of plastic paint. If the layer 31 is deposited too thick it will build up heat, part from film 30, and shrink due to curing and cooling.

Layer 32 is a so-called laminate consisting of several, such as 10, layers of glass cloth impregnated with epoxy resin such as available under the proprietary name "Ciba" Araldite 502 and using about 10% of a hardener "Ciba" 951 amine. It is important to have the laminate completely free of air. Entrapped air is often encountered if the glass layers are first impregnated and then laid one upon the other. By applying a thin layer of resin first and then pressing the dry porous glass cloth into the uncured resin layer all of the entrapped air easily escapes through the porous cloth before it becomes impregnated with resin. Applying the glass cloth as a dry layer further permits the layers of glass to be concentrated closer together and the resin layers to be extremely thin adding strength to the built-up laminate layer. When building up the layers of glass cloth it may be necessary to permit one or two layers to partially cure before proceeding with the subsequent glass layers. Partial curing of the layers completely avoids heat build up due to exothermic action and permits the laminate layer to be made without any shrinkage or distortion.

Figure 3:
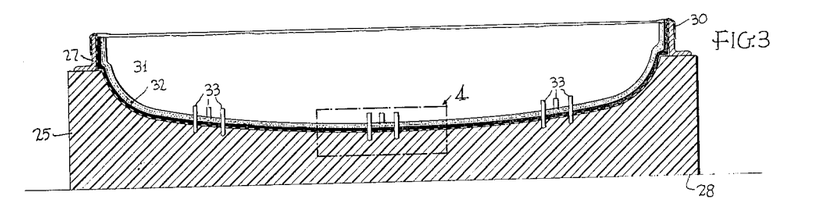
FIG. 3 is a section similar to FIG. 2 illustrating the formation of the working surface of the novel structure.
Figure 4:
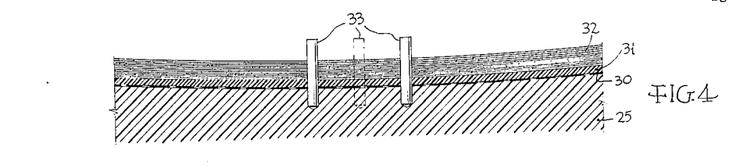
FIG. 4 is a fragmentary section on a larger scale of the region surrounded by dot-and-dash line 4 of FIG. 3.
Figure 12:
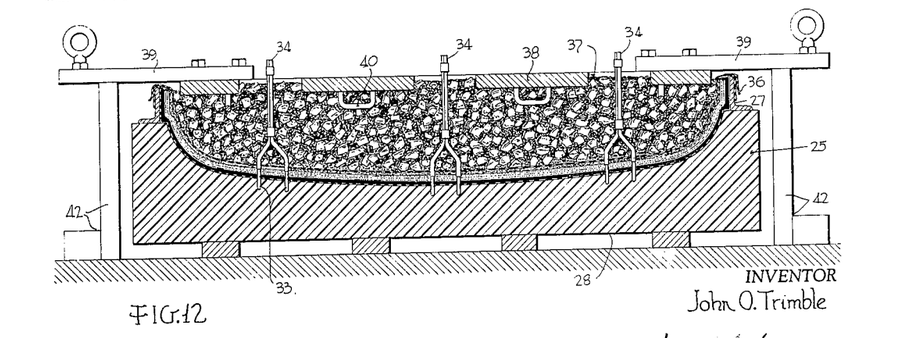
FIG. 12 is a section similar to FIG. 10 illustrating the structure after the addition of the remaining plastic-aggregate composition.
Figure 13:
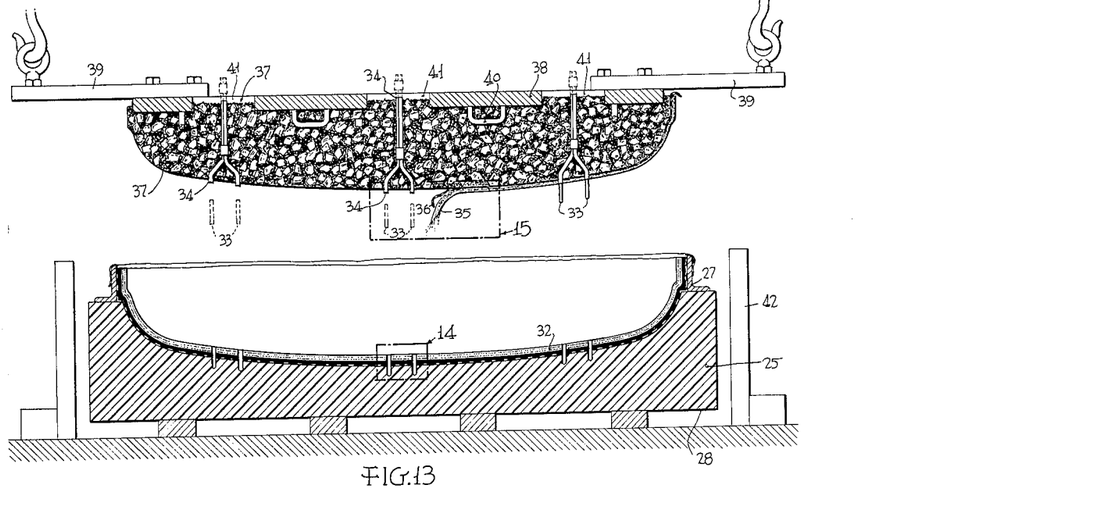
FIG. 13 is a section corresponding to FIG. 12 showing the back-up structure removed from the mold and the surface layer remaining in the mold.

After the laminate 32 has been allowed to harden completely, holes are drilled through the layers 30, 31, 32 and part-way into the form 25, which holes are then plugged up by wooden pegs 33 (FIGS. 3 and 4). Copper tubes 34 are fitted over the projecting inner ends of the pegs 33 (FIGS. 5 and 6) and are dimensioned and arranged to extend all the way through the rear of the finished die as shown (FIG. 12). The purpose of the tubes is to vent the die as it would be very difficult to drill later on, as customary for metal dies, through the novel die.

Figure 5:
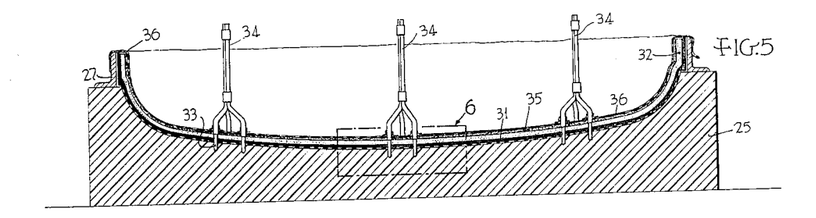
FIG. 5 is a section similar to FIG. 3 illustrating a further step in the manufacture of the die.
Figure 6:
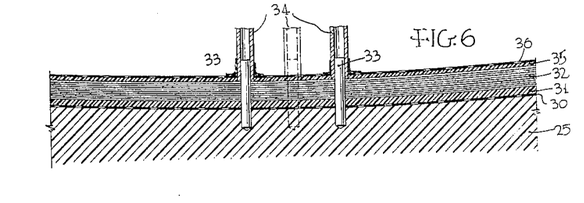
FIG. 6 is a fragmentary section on a larger scale of the region surrounded by dot-and-dash line 6 of FIG. 5.
Figure 7:
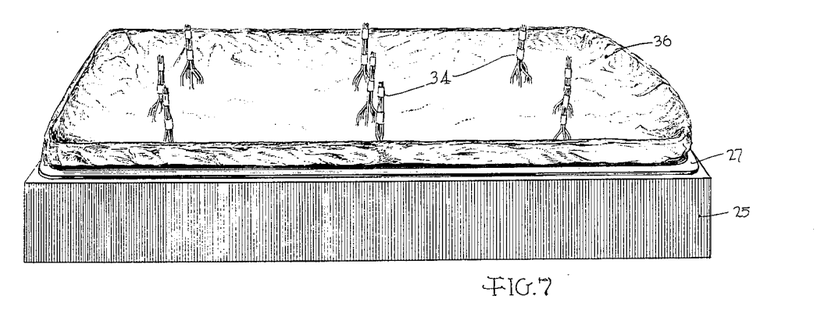
FIG. 7 is a perspective view of the manufacturing stage shown in FIGS. 5 and 6.

To the inside of the laminate 32 is applied a layer of asbestos 35, about 1/16 inch thick. A sheet of polyvinyl chloride film 36, e.g. approximately .01" thick, is placed on top of layer 35 and properly sealed around the tubes 34 (FIGS. 5 to 7). Film 36 serves as a parting means for preventing the subsequently to be applied resin to adhere to the asbestos 35, and provides a space for the latter to be described securing of backing 37 to the laminated structure 32. Layer 35 acts mainly as a heat insulator between laminate 32 and backing 37. When film 36 and layer 35 are completely flexible and of uniform thickness they completely follow the contour of the rear surface of laminate 32. As will be expalined later if proper precautions are taken the asbestos layer 35 may be omitted for it is possible to cast the backing 37 to the contour of the rear surface of the laminate 32 without building up too much heat due to exothermic action of the resin cast in the backing layer.

The completed structure shown in FIG. 7, is now ready for casting the backing 37 which is preferably made in two or more successive stages or installments, so as to facilitate and speed up curing and heat dissipation from exotherm and to minimize dimensional changes.

Figure 8:
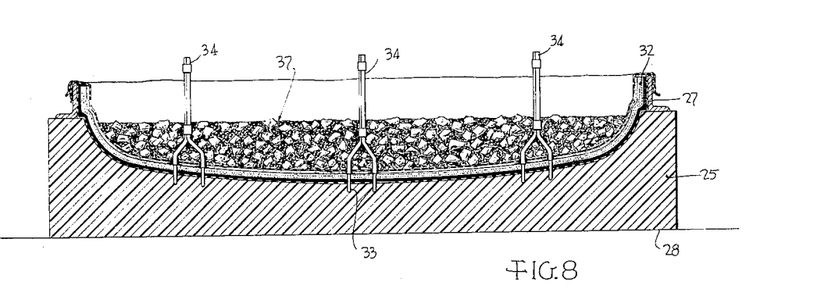

The first casting stage (FIG. 8) starts with pouring a mixture of an epoxy resin and, say, about 8% hardener on top of film 36 whereupon crushed stone is stamped into the resin. Again the same brands of resin may be used as mentioned hereinbefore. The stone may amount to about three times or more by weight the amount of the resin mixture. An alternative method of casting the backing is to first wet the crushed stone or aggregate with the resin to provide a very thin film or coating over the stone. This wetted stone may then be poured on top of film 36 and allowed to partially cure before two or more successive stages or installments of resin are added to the cavities between the wet crushed stone. This latter method has been extremely successful for it permits sufficient air circulation in the crushed stone mass to avoid harmful heat build-up in the backing eliminating any need for the asbestos layer 35. The crushed stone acts as an incompressible mass so that the cured backing is almost completely free of distortion.

Figure 9:
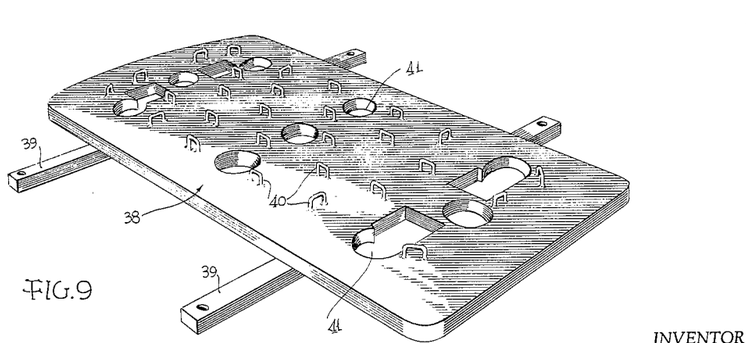
FIG. 9 is a perspective view of a metal supporting plate for the die in upside down position.
Figure 19:
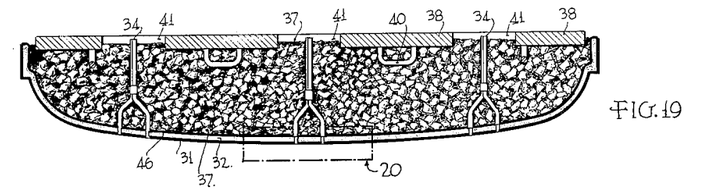
FIG. 19 is a section through the finished die as shown in FIG. 17, but after its removal from the mold.
Figure 20:
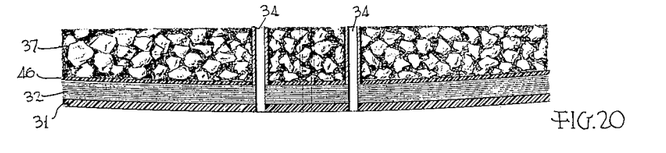
FIG. 20 is a fragmentary section on a larger scale of the region surrounded by line 20 of FIG. 19.
Figure 21:
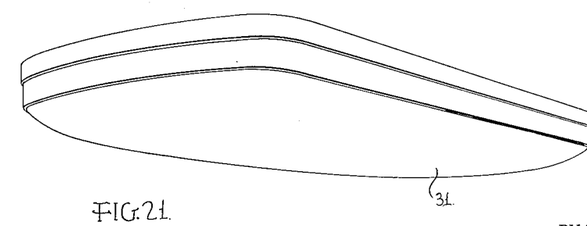
FIG. 21 is a three-quarter underside perspective of the finished die.

A heavy metal plate 38, a so-called tank plate, for example 3 inches thick is to serve as backbone of the die and as securement means to bed or ram of a die press (non-illustrated). Plate 38 (FIG. 9) has the approximate contour of the finished die (FIG. 19). Steel bars 39 are bolted to plate 38 for handling and positioning, and U-shaped rods 40 are welded to it for forming mechanical locks with the backing 37. Openings 41 in the plate give access to the space underneath the plate for purposes to become evident later on.

Figure 10:
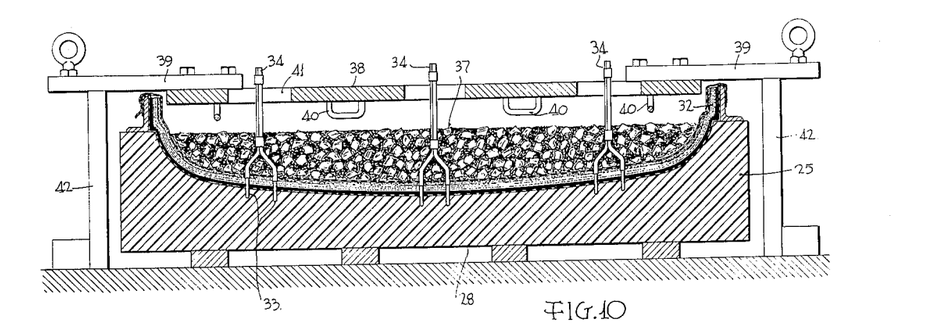
FIG. 10 is a section similar to FIG. 8 with the supporting plate of FIG. 9 supported in its desired position relative to the die.
Figure 11:
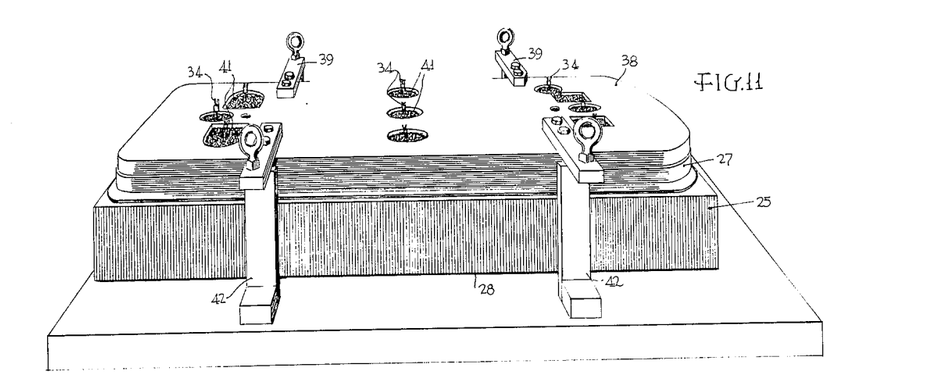
FIG. 11 is a perspective view of the manufacturing stage illustrated in FIG. 12.

After exotherm from the first casting has subsided, plate 38, as shown in FIG. 10, is secured above the partly-filled form by bars 39 and positioning means 42 so that the tubes 34 extend through the openings 41. The second casting stage is now carried out in the same manner as the first stage except that it is done through the holes 41. First resin is poured in and then the stones or the like are tamped into the resin through the holes 41. The completion of this stage is shown in FIG. 12.

The casting 37 with plate 38, after the resin having been allowed to cure (approximately 24 hours for the particular above described resin), is removed from laminate 32. Asbestos layer 35 and film 36 are stripped from casting 37. The casting is allowed to stand several days (approximately 4 days) before adhesively bonding it to laminate 32 with its working or surface layer 31.

Figure 14:
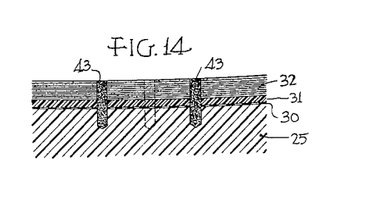
FIGS. 14 and 15 are fragmentary sections on a larger scale of the regions surrounded by the correspondingly numbered dot-and-dot lines of FIG. 13.
Figure 15:
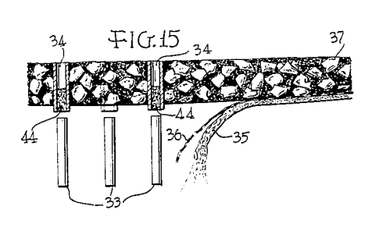
Figure 18:
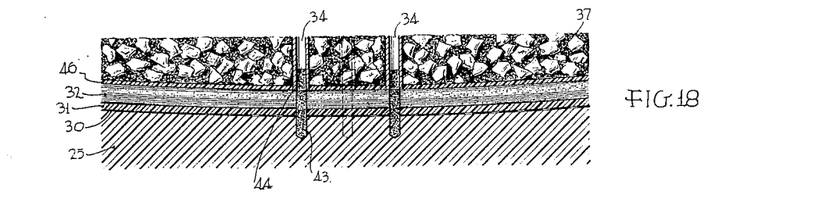
FIG. 18 is a fragmentary section on a larger scale of the region surrounded by dot-and-dash line 18 of FIG. 17.

In preparation of the bonding step, the holes in laminate 32 and mold 25 are plugged with clay 43 (FIG. 14) and the ends of the pipes 34 are sealed by similar plugs 44, after removal of the wooden pegs 33 (FIGS. 15 and 18).

Figure 16:
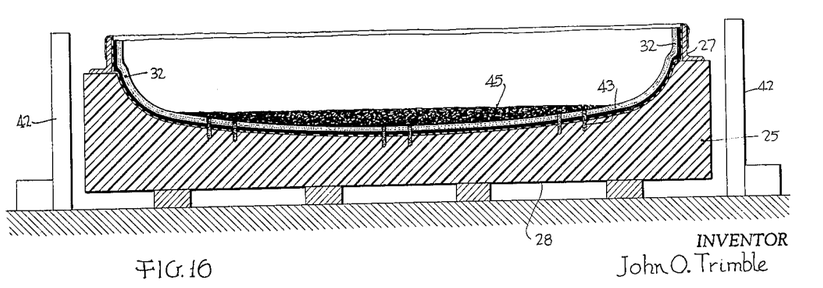
FIG. 16 is a section corresponding to the lower part of FIG. 13, illustrating the preparation of the surface structure for final connection with the back-up structure.
Figure 17:
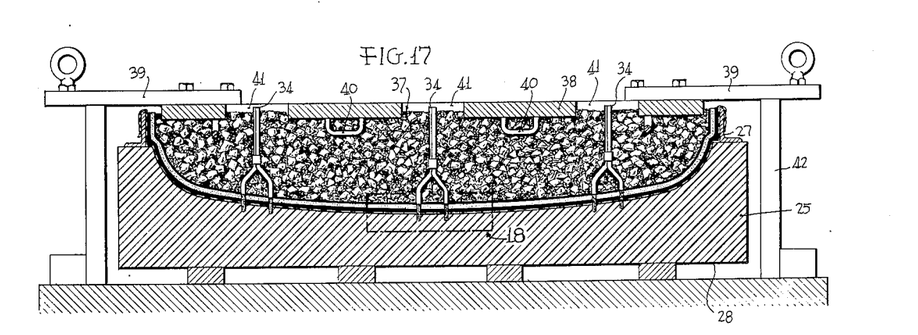
FIG. 17 is a section similar to FIG. 13 illustrating the final joinder of surface structure and back-up structure.

A puddle 45 of resin is poured into the cavity presented by laminate 32 (FIG. 16), whereupon backing 37 is lowered and forced into this puddle and securely held in exactly the same, previously occupied position relative to mold 25 and the layers 31, 32. The resin of the puddle rises to fill the space previously taken up by asbestos 35 and parting film 36 and to form a bonding layer 46. It is advisable to provide a surplus of resin in puddle 45 so that the resin spills out over the edge of mold 25 and its dam 27.

After the layer 46 has been allowed to harden, dam 27 is removed and the completed die is lifted out of mold 25, and the die is finished by removing clay plugs 43, 44, cutting the excess length of tubes 34, and by polishing its surface. The novel manner in which the backing is cast from the rear surface of the laminate 32 permits some shrinkage to occur in the backing 37. While precautions are taken to minimize the shrinkage in the backing 37, any time a mass of resin is allowed to cure and build-up heat due to exothermic action there is necessarily some shrinkage and distortion due to non-uniform cooling and inherent physical shrinkage in the curing of the plastic mass. When the backing 37 is joined to the laminate layer 32 the positioning means 42 insure that a bonding layer 46 is at least as thick as the parting layer 36 and insures a complete and uniform bond of the backing 37 to the laminate 32. Had the positioning means 42 not been provided it would be possible to misalign the backing plate 38 relative to the mold contour surface 26 creating a misaligned die which would not properly function when installed in a press. It is important to perfectly align the backing plate 38 relative to the contour surface 26, and also necessary in order to utilize the maximum strength of the structural combination and avoid distortion to insure that the bonding layer 46 is thin and approaches uniform thickness. Even though the rear surface of the laminate 32 has a completely random surface due to the manner in which the layer is built up, the backing 37 which is cast from the laminate 32 follows completely the random contour surface of laminate 32. This is made possible by employing a thin parting film 36 which is completely flexible and is forced to follow the random contours of the rear surface of laminate 32.

Figure 22:
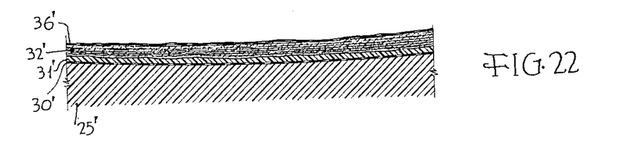
FIG. 22 is a fragmentary section of a modified molded laminar wear resisting layer prepared in the mold with a parting layer prior to making the backing.
Figure 23:
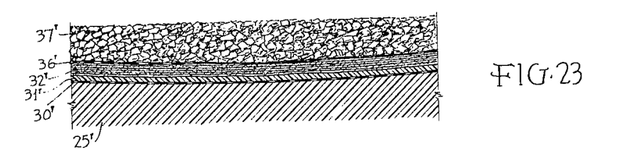
FIG. 23 is a fragmentary section of FIG. 22 showing the backing cast against the parting layer to the contour of the back of the wear resisting layer.

FIGS. 22 to 26 show a modified molded laminar wear resisting layer 31', 32' which may be employed in the novel die. As shown in FIG. 22 a parting film 30' is prepared on the mold 25' and the wear resisting layer 31', composed of a high strength plastic and hard powder binder, is applied to the parting film 30' as a thin layer approximately ¼" in thickness. Before the layer 31' is hardened, a very thin laminate of one or more layers of glass fiber and resin 32' may be applied. This modified operation requires a high degree of skill to avoid forcing the glass fiber layer into the wear resisting layer creating a non-uniform thickness which is not desired. After the laminate 31', 32' has completely hardened to provide sufficient structural strength to support the backing 37' a parting film 36', which will not adhere or be wetted by the resin in the backing, is applied to the laminate layer 32'. This layer 36' will be stretched and forced to the exact contours of the laminate 32' by the weight of the backing 37'. As shown in FIG. 23 the backing 37' may be cast from the random contour surface of the laminate 32' separated only by the flexible parting layer 36'.

Figure 24:
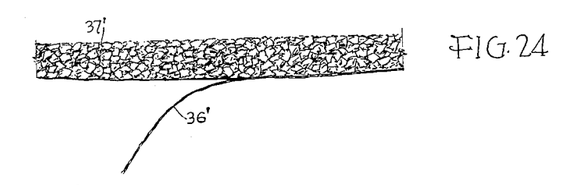
FIG. 24 is a fragmentary section of the backing of FIG. 22 removed from the back of the wear resisting layer and showing the parting layer being removed.
Figure 25:
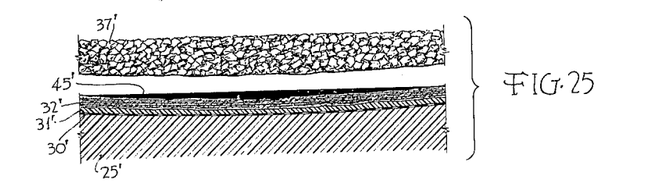
FIG. 25 is a fragmentary section of wear resisting layer of FIG. 22 and the backing of FIG. 24 being bonded together.
Figure 26:
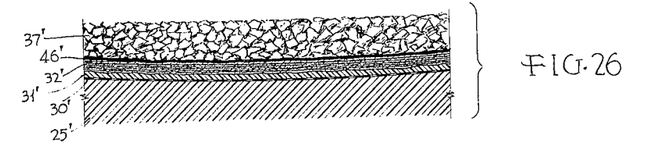
FIG. 26 is a fragmentary section of the modified molded laminar wear resisting layer and backing as a composite die structure.
Figure 27:
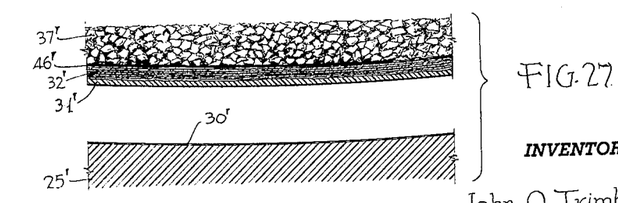
FIG. 27 is a fragmentary section of the composite die structure of FIG. 26 removed from the mold.

After the backing 37' has sufficiently cured it may be removed from the surface of laminate 32' and the parting layer 36' stripped from the backing 37'. It will be noted that the surface of the backing 37' has a contour exactly duplicating the contour of the rear surface of the laminate 32'. A puddle 45' of high strength resin is placed in the cavity formed by the back of the laminate 32' and the backing 37' is forced into the uncured resin. Backing plate 38' (not shown) is positioned by bars 39' (not shown) cooperating with positioning means 42' (not shown) to insure a uniform bonding layer 46' between laminate 32' and backing 37'.

The completed die is then fitted into a matching die (not shown) in any customary or suitable manner.

Summing it up, the finished die comprises:
 (a) a thin face coat 31 of resin and binder;
 (b) a laminate 32 of glass cloth and resin;
 (c) a thin layer 46 of pure resin;
 (d) a structural casting 37 of stone aggregate and resin; and
 (e) a steel backing and mounting plate 38.

A suitable material for the stone aggregate was found to be granite (½ inch screen size) but other materials can be used such as basalt, slag from iron or steel mills, and other similar materials. It was found advantageous to use an aggregate having particles of varying rather than the same size and shape to provide an interlocking incompressible mass.

The advantages obtained by the novel die and method of making it are apparent from a specific embodiment of a die measuring approximately 5 feet by 8 feet. The finished die was made to the true dimensional accuracy and contour of the negative mold employing high strength thermosetting plastics as described hereinbefore. Forming the thin face layer 31 of thermosetting plastic and binder on the surface 26 of the negative mold 25 permitted a thinner and more uniform face layer of the die. The thin face layer was stronger than a thick face layer and the uniformness of the face layer avoided peeling or cracking due to stress concentrations at the surface of the laminate layer. Forming and curing the face layer in the mold alone insured that the facing layer was free of air bubbles as well as thin and uniform, and insured that the face layer cured while adhered to the parting layer 30 in mold 25, thus duplicating the exact dimensions of the mold. Had the face layer 31 been cured while any layer 32 or backing 37 was bonded thereto, curing and shrinkage could cause the face layer 31 to pull loose from the parting layer 30 of the mold 25, thus creating distortions in the working surface of the face layer 31. Because layer 31 was thin its apparent strength was improved by the reinforcing laminate layer 32.

Casting the backing 37 from the cured shell comprising face layer 31 and laminate 32 creates an extremely close fit. In the specific embodiment of the auto roof die a thin flexible parting layer of asbestos 35 and PVC film 36 was employed between the shell and the backing 37 when cast. Even though some shrinkage occurred in the backing 37 as it cured, distortions were stabilized by the backing plate 38. When the backing was bonded to the shell by a thin plastic layer 46 the backing and shell were separated by a thin uniform layer even though the contour of the shell was completely random and varied from a norm by a dimension greater than the thickness of the bonding layer 46. In smaller dies the bonding layer can be made thinner than the specific embodiment, but in no case should the bonding layer be made thick enough for the layer in the die to react as a pure plastic layer if maximum strength is to be obtained.

A section cut through the die would reveal the two roughly parallel surfaces of the backing 37 and the laminate 32 joined by the bonding layer 46.

Had a matrix block been cast as a backing the block would shrink one percent whether cast in metal or plastic, and if spacer layers were employed over the mold as has been the former practice there would be no random contour of the shell to duplicate. Instead of the close fit between the backing and the face layer there could only be mass space filler between the backing and the shell, but never the thin or uniform layer which is superior in physical strength.

Shear test of the backing material indicates that the plastic which is inherently weak in shear acted as a thin interconnected matrix between the aggregate and caused shear failure in the aggregate rather than shear failure in the resin. The glass fiber cloth in the laminate 32 was found to have an inherent strength greater than the face layer 31, but the hard wear resisting layer 31 was thin enough to transmit compression loads into the laminate 32 providing a die surface which had a compressive strength inherently stronger than the epoxy resin used in the wear resisting surface 31. It was also found that stress concentrations built up in the layers 31 and 32 were uniformly transmitted and dispersed through the bonding layer 46 into the backing 37 and backing plate 38 creating a composite die far superior to cast plastic and reinforced plastic dies known heretofore.

The invention is not restricted to the specific features and details described hereinbefore and illustrated in the drawing but is susceptible to modifications and to adaptations to different conditions and problems, such as for example:

While epoxy resin with a hardener was found to be very suitable, the invention is not necessarily restricted to specific types of resins now known or to be developed in the future. The resins need not be pure but they may be used with known, hereinbefore mentioned finely comminuted or powdered fillers. The proportions between aggregate and resin binder may go much higher than described, such as up to 10 to 1. Certain aspects of the invention are furthermore not restricted to the indicated formation of the surface layer but other surface layers may be used, such as a surface layer formed by a shell of metal, which may be sprayed or electro-deposited and to which a reinforced shell and/or backing may be applied in substantially the same manner as described hereinbefore.

What is claimed is:

1. A method of making a plastic die by bonding a cast plastic backing to a built-up reinforced plastic shell comprising, applying a flow resistant thin uniform thickness wear resisting filled plastic facing layer over a mold surface, allowing said facing layer to self harden in the open atmosphere, reinforcing said facing layer by building up a laminar layer of thermosetting plastic and reinforcing binder onto said facing layer, allowing said built-up laminar layer to self harden, placing a thin parting film over the built-up and cured laminar layer, pouring a mixture of thermosetting plastic and aggregate over said thin parting film to form a casting, and allowing said backing to self cure having the shape of said laminar layer, removing said cured cast backing from said laminar layer, removing said parting film from said cast backing, placing a mass of liquid thermosetting plastic onto said laminar layer, placing said cast backing onto said mass of thermosetting plastic on said laminar layer, and supporting said backing so that said liquid thermosetting plastic mass occupies the space formerly occupied by said parting film, allowing said thermosetting plastic mass to self cure between said backing and said laminar layer as a thin bonding film, and removing said plastic die from said mold surface.

2. A method of making a composite plastic forming die by bonding a cured reinforced thermosetting plastic shell to a cured reinforced plastic backing comprising, producing a negative mold of the die surface to be made, coating the negative mold die surface with a parting agent, applying to the coated die surface of said negative mold a flow resistant thin uniform thickness layer of thermosetting plastic combined with a filler and a thixotropic agent to make a non-flowing plastic wear resisting layer, allowing said wear resisting layer to self cure in the open atmosphere in position in said mold as a thin uniform thickness air free layer, laying thin sheets of fibrous material impregnated with plastic on said cured wear resisting layer, allowing said impregnated fibrous sheets to partially cure as thin laminar layers to build up a thicker laminar layer, allowing said laminar layer to cure to a hard shell, laying a thin uniform film of flexible parting material over said shell, depositing a backing of thermosetting resin and closely packed aggregate filler over said thin film in said shell, placing a backing plate on positioning means so that connection means provided on said backing plate extend into said backing of resin and aggregate, allowing said backing to cure and become fastened to said backing plate, removing said backing from said shell, removing said thin uniform film of parting material from said backing, applying a layer of thermosetting plastic into said shell, replacing said backing plate on said positioning means to locate said backing in said shell and to squeeze out the layer of thermosetting plastic in said shell leaving a thin uniform bonding layer of thermosetting plastic between said backing and said shell, allowing said thin layer of thermosetting plastic to cure, and removing said plastic forming die from said negative mold.

3. The method of making a forming die comprising the steps of spreading a thick flow resistant wear resisting layer on a negative mold, allowing said wear resisting layer to self harden in the open atmosphere, reinforcing said wear resisting layer with layers of reinforced set hardening plastic bonded to said wear resisting layer, allowing said reinforcing layers to harden, covering said wear resisting layer with a thin parting film, depositing a backing material onto said thin parting film and allowing it to self harden, separating said laminar layer and said backing and removing said parting film, and reuniting said laminar layer and said backing material with the interposition of an adhesive into the space previously occupied by said thin parting film.

4. The method of making a plastic forming die comprising the steps, of making a negative mold of the die surface to be formed, of coating said negative mold with a parting compound, of applying to said coated mold a flow resistant thin uniform thickness plastic mixture, of allowing said plastic mixture to self harden in the open atmosphere as a die face layer, of reinforcing said die face layer with a laminar layer of reinforced plastic, of allowing said laminar layer to harden, covering said laminar layer with a thin flexible film, of casting a reinforced plastic backing in the mold formed by the thin flexible "parting" film over said laminate layer, of allowing said backing to cure, of removing said backing, of removing said parting film, of pouring a puddle of adhesive over said laminar layer, and of recombining said backing and said laminar layer, and allowing said adhesive to cure as a thin film between said backing and laminar layer.

5. The method of making a forming die comprising the steps, applying a thin flow resistant filled plastic layer to a mold surface applying a built-up shell on the surface of said flow resistant filled plastic layer having the contour of a die surface, allowing said shell to self harden and cool in the open air, covering said shell with a thin flexible film of sheet material, pouring a mass of self hardening plastic into the rear cavity of said built-up shell, allowing said mass of plastic to harden and cure to the shape of the rear of said shell cavity, removing said cured mass of plastic from said shell, removing said thin flexible film of sheet material, of reuniting said cured mass of plastic and said shell with the interposition of an adhesive into the space previously occupied by said film, allowing said adhesive to cure and harden, and removing said shell with said attached plastic mass as a backing from said negative mold as a solid composite die structure.

References Cited by the Examiner

UNITED STATES PATENTS

| | | | |
|---|---|---|---|
| 576,482 | 2/1897 | Streetman | 22—135 |
| 1,336,388 | 4/1920 | Youngberg | 113—49 |
| 1,935,885 | 11/1933 | Meissner. | |
| 1,935,916 | 11/1933 | Ragsdale | 113—49 |
| 1,940,294 | 12/1933 | Calkins | 113—49 |
| 1,947,085 | 2/1934 | Hill et al. | |
| 2,206,812 | 7/1940 | Fitzgerald et al. | 113—49 |
| 2,347,233 | 4/1944 | Abernathy | 260—37 |
| 2,356,860 | 8/1944 | Lewis | 18—35 |
| 2,372,917 | 4/1945 | Tuttle | 113—44 |
| 2,388,776 | 11/1945 | Wallace | 18—58 |
| 2,390,183 | 12/1945 | Seligman | 113—49 |
| 2,413,729 | 1/1947 | Rushmer. | |
| 2,460,242 | 1/1949 | Renaud | 18—58 |
| 2,495,640 | 7/1950 | Muskat | 154—110 |
| 2,560,599 | 7/1951 | Ryan | 154—110 |
| 2,561,999 | 7/1951 | Stuck | 264—275 |
| 2,724,868 | 11/1955 | Kish | 264—275 |
| 2,734,243 | 2/1956 | Lips et al. | 22—193 |
| 2,738,297 | 3/1956 | Pfistershammer | 154—52.5 |
| 2,777,790 | 1/1957 | Kish | 154—110 |
| 2,836,530 | 5/1958 | Rees | 113—49 |
| 2,845,379 | 7/1958 | Bey | 264—220 |
| 2,854,344 | 9/1958 | Comisso | 94—3 |

ROBERT F. WHITE, *Primary Examiner.*

CHARLES W. LANHAM, *Examiner.*

R. J. HERBST, M. R. DOWLING, *Assistant Examiners.*